United States Patent

Stary et al.

[11] 4,058,147
[45] Nov. 15, 1977

[54] FLAMMABLE VAPOR RECOVERY SYSTEM

[75] Inventors: Marvin L. Stary; Edward L. Brown, both of Claremont; Eric L. Pridonoff, Pasadena, all of Calif.

[73] Assignee: Clean Air Engineering, Inc., Anaheim, Calif.

[21] Appl. No.: 612,781

[22] Filed: Sept. 12, 1975

[51] Int. Cl.² ............................................. B65B 31/06
[52] U.S. Cl. ........................................... 141/45; 55/88; 55/387; 141/59; 141/98; 220/85 S; 220/85 VR; 431/5
[58] Field of Search ............ 55/88, 387; 141/1, 41–45, 141/52, 59, 82, 98, 287, 290, 303, 392; 220/85 S, 85 VR, 85 VS; 431/5, 7

[56] References Cited

U.S. PATENT DOCUMENTS

| | | | |
|---|---|---|---|
| 2,225,844 | 12/1940 | Pye | 141/303 X |
| 3,826,291 | 7/1974 | Steffens | 141/59 |
| 3,867,111 | 2/1975 | Knowles | 55/88 X |
| 3,897,193 | 7/1975 | Kattan et al. | 220/85 VR |
| 3,907,010 | 9/1975 | Burtis et al. | 141/45 |
| 3,914,095 | 10/1975 | Straitz | 141/52 X |
| 3,996,975 | 12/1976 | Hansel | 141/45 |

Primary Examiner—Richard E. Aegerter
Assistant Examiner—Frederick R. Schmidt
Attorney, Agent, or Firm—William P. Green

[57] ABSTRACT

A vapor recovery system in which gasoline vapors or other flammable vapors are withdrawn from the vicinity of a dispensing nozzle at a service station or the like, and are disposed of by combustion in a burner system, preferably consisting of two burners selectively usable for burning vapor-air mixtures of different B.T.U. contents. The vapors may be temporarily stored by adsorption onto an adsorbing substance, and then be removed from that substance by conducting a flow of air therepast.

15 Claims, 10 Drawing Figures

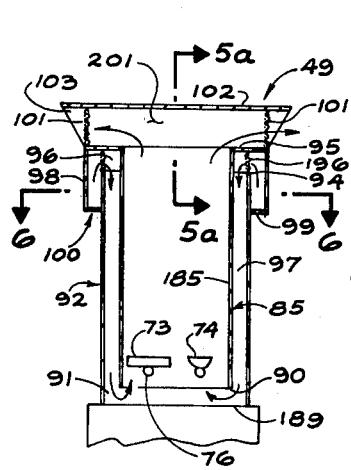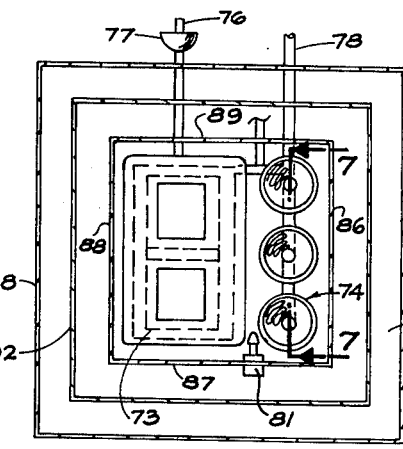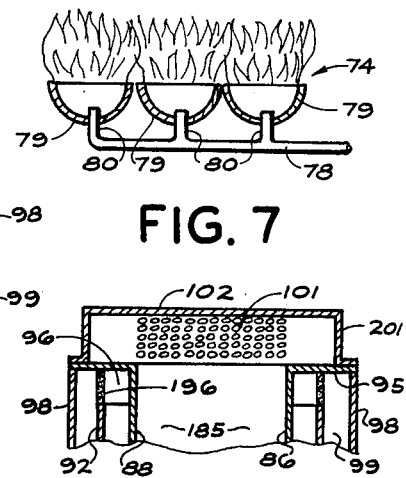
FIG. 5   FIG. 6   FIG. 7
FIG. 5a
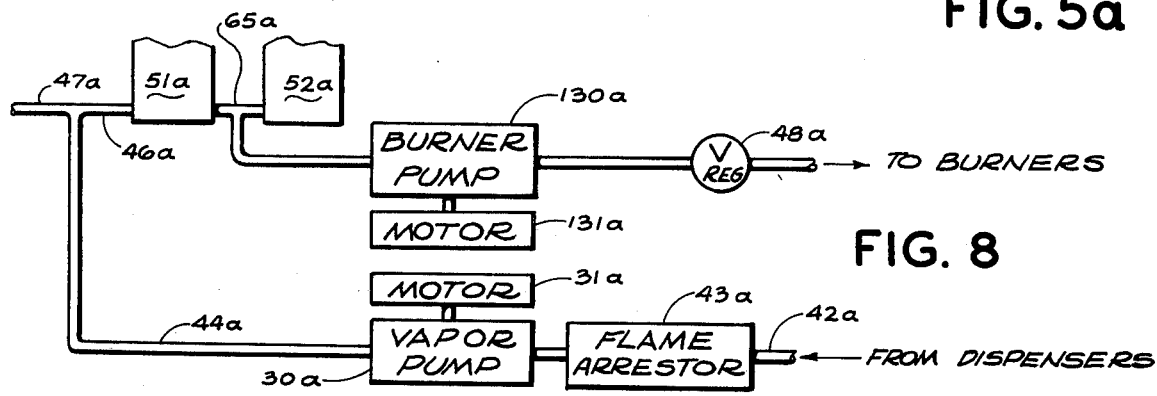
FIG. 8
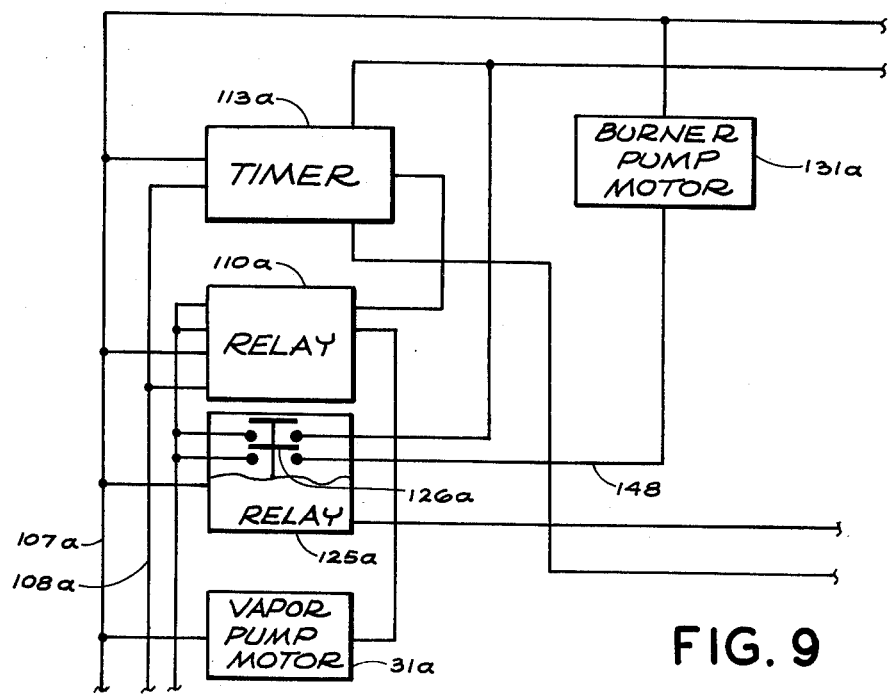
FIG. 9

FLAMMABLE VAPOR RECOVERY SYSTEM

REFERENCE TO RELATED APPLICATION

Certain features of the apparatus shown and claimed in the present application have been disclosed in our prior copending application Ser. No. 478,519 filed June 12, 1974, now U.S. Pat. No. 3,926,230.

BACKGROUND OF THE INVENTION

This invention relates to improved apparatus for collecting and disposing of gasoline vapors or other flammable vapors which might otherwise escape into and pollute the atmosphere, as for instance during the filling of fuel into an automobile tank at a service station.

With the greatly increased emphasis in recent years on attaining improvement of environmental conditions, considerable effort has been expended, among other things, in attempting to prevent escape of gasoline vapors into the atmosphere at service stations, and particularly during the filling of gasoline into an automobile tank, as well as during the filling of the service station tanks themselves from a fuel delivery truck. One type of proposed prior art arrangement for the purpose is disclosed in U.S. Pat. No. 3,581,782 issued June 1, 1971, in which vapors withdrawn from the vicininty of a service station dispensing nozzle are absorbed onto a mass of activated charcoal or other adsorbent material, and are ultimately desorbed from that material for disposal. Various forms of the invention shown in that patent dispose of the vapors by injection into the carburetor of the engine of a fuel delivery truck, or refrigeration to liquify the vapors and return them to a main storage tank, or oxidation in a catalytic converter. At one point, the patent mentions that the vapors may be "burned in a controlled system", but gives no details of the type of system contemplated.

SUMMARY OF THE INVENTION

The major object of the present invention is to provide an improved vapor recovery system which is capable of collecting and disposing of flammable vapors from a service station or the like with increased effectiveness as compared with prior systems of which I am aware. A system embodying the invention is capable of collecting close to 100 percent of the vapors which would otherwise escape into the atmosphere during a fueling operation, and does so with no disruption of or adverse effect on the dispensing procedure, and at a minimum cost of operation. Further, the equipment can be essentially silent in operation, and can function over very long periods of time with little or no maintenance.

In the equipment, the vapors are withdrawn from the vicinity of the fuel dispensing nozzle or nozzles by a vapor pump, and are ultimately delivered to a burner system in which complete combustion converts the vapors to carbon dioxide and water, which are then emitted into the atmosphere without pollution thereof. Some of the vapors collected by the pump may be returned into the main underground storage tank or tanks of the service station, to replace the liquid removed from those tanks by the dispensing operation. Any excess vapors which may be accumulated at a particular time are adsorbed onto an adsorbent substance in a filter cannister or cannisters, with intermixed air ultimately discharging to the atmosphere from the cannisters after adsorption of the vapors. At appropriate times, the flow of air may be reversed, to remove the vapors from the adsorbent material, and feed the air-vapor mixture to the burner system.

Certain particular features of the invention relate to a preferred burner arrangement in which two different burners are employed for burning vapor-air mixtures of different B.T.U. contents, with automatic control means serving to shift between one of the burners and the other in accordance with the B.T.U. content of the mixture. The automatic control equipment attempts to light the burners intermittently, preferably in response to manual actuation of a control part at the commencement of a dispensing operation. A control timer may attempt to light the two burners in a predetermined sequence, to first ignite a burner in which low B.T.U. content vapors are burned without addition of extra air at the burner, and then attempt to light a second burner designed especially for handling air-vapor mixtures of higher B.T.U. content, with the addition of extra air at that burner. When the adsorbed vapors have ultimately been removed fairly completely from the adsorption bed, the high B.T.U. content burner may go out, or reduce its flame to a level causing response of an automatic control element, with the latter then causing the remaining vapors to be diverted to and burned by the low B.T.U. content burner, until substantially all of the vapors are removed from the adsorbent substance which is then left in a clean condition until the next successive dispensing operation.

As another feature of considerable significance to the invention, it is preferred that the apparatus include a vapor pump interposed operatively between the adsorbent chamber and burner or burners, with the pump acting to take suction through the adsorbent material and acting to discharge an air-vapor mixture to the burners. In one form of the invention, a single vapor pump may serve dual purposes as this burner feed pump and as the previously mentioned vapor pump which withdraws vapors from the vicinity of the fuel dispensing nozzles. A unique piping arrangement permits this dual functioning of a single pump. In another form of the invention, two separate pumps are employed for accomplishing the two purposes.

Still another feature of the invention resides in the structure of a burner unit which may be employed in the equiqment, and in which products of combustion from a burner pass upwardly through a vertically elongated stack to ultimately discharge from the top of the stack to the atmospere, with incoming air being directed downwardly along a passage at the outside of the stack, to maintain the outer walls of the unit cool and isolate the burner flame or flames from direct lateral communication with the outside of the unit.

BRIEF DESCRIPTION OF THE DRAWINGS

The above and other features and objects of the invention will be better understood from the following detailed description of the typical embodiments illustrated in the acompanying drawings in which:

FIG. 5 is a vertical section through the vapor burning stack unit of the invention, taken on line 5—5 of FIG. 1;

FIG. 5a is a vertical section on line 5a—5a of FIG. 5;

FIG. 6 is an enlarged horizontal section taken on line 6—6 of FIG. 5;

FIG. 7 is a further enlarged vertical section taken on line 7—7 of FIG. 6;

FIG. 8 is a flow diagram representing fragmentarily a variational form of the invention; and FIG. 9 is an electrical control circuit representing fragmentarily a circuit which may be utilized in conjunction with the FIG. 8 arrangement.

DESCRIPTION OF THE PREFERRED EMBODIMENTS

Figure 1:
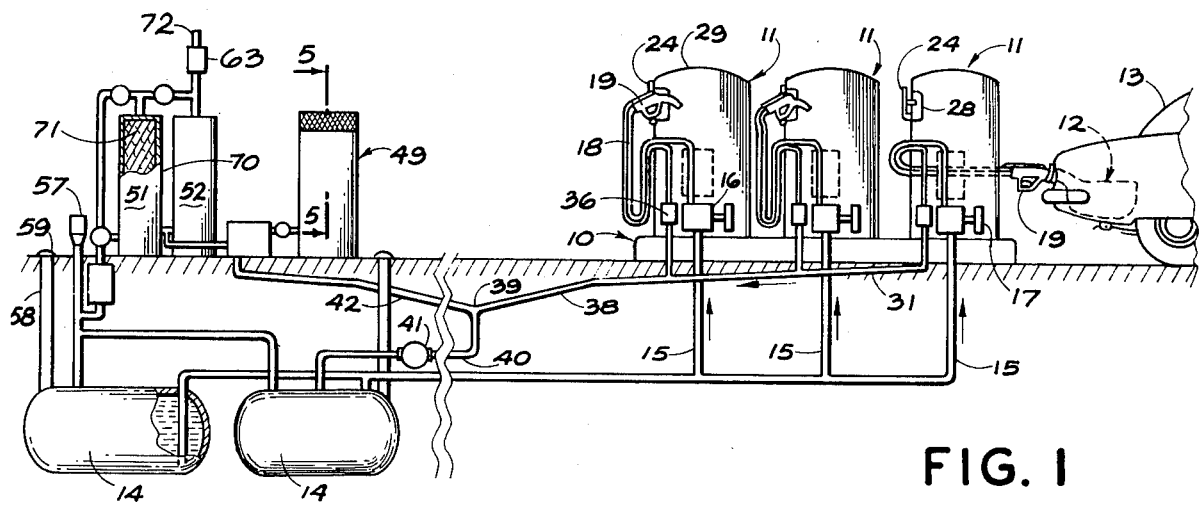
FIG. 1 is a representation of a service station installation embodying the invention.

FIG. 1 illustrates generally at 10 a service station island having a number of fuel dispensing pump assemblies 11 for filling gasoline or other fuel into the tank 12 of a motor vehicle 13. The pump assemblies or fuel dispensing units 11 receive fuel from one or more underground tanks 14 through lines represented at 15, with each dispensing unit containing a pump 16 driven by an electric motor 17. Upon energization of motor 17, pump forces the flammable fuel from tank 14 through a conventional flexible hose 18 to a dispensing nozzle unit 19 whose discharge end 20 is adapted and dimensioned to project into the filling neck 21 of vehicle tank 12 to deliver fuel thereto. The nozzle unit 19 has the usual manually actuated trigger element 22, which actuates a valve 23 to start and stop the discharge of fuel from the discharge portion 20 of the nozzle assembly.

Figure 3:
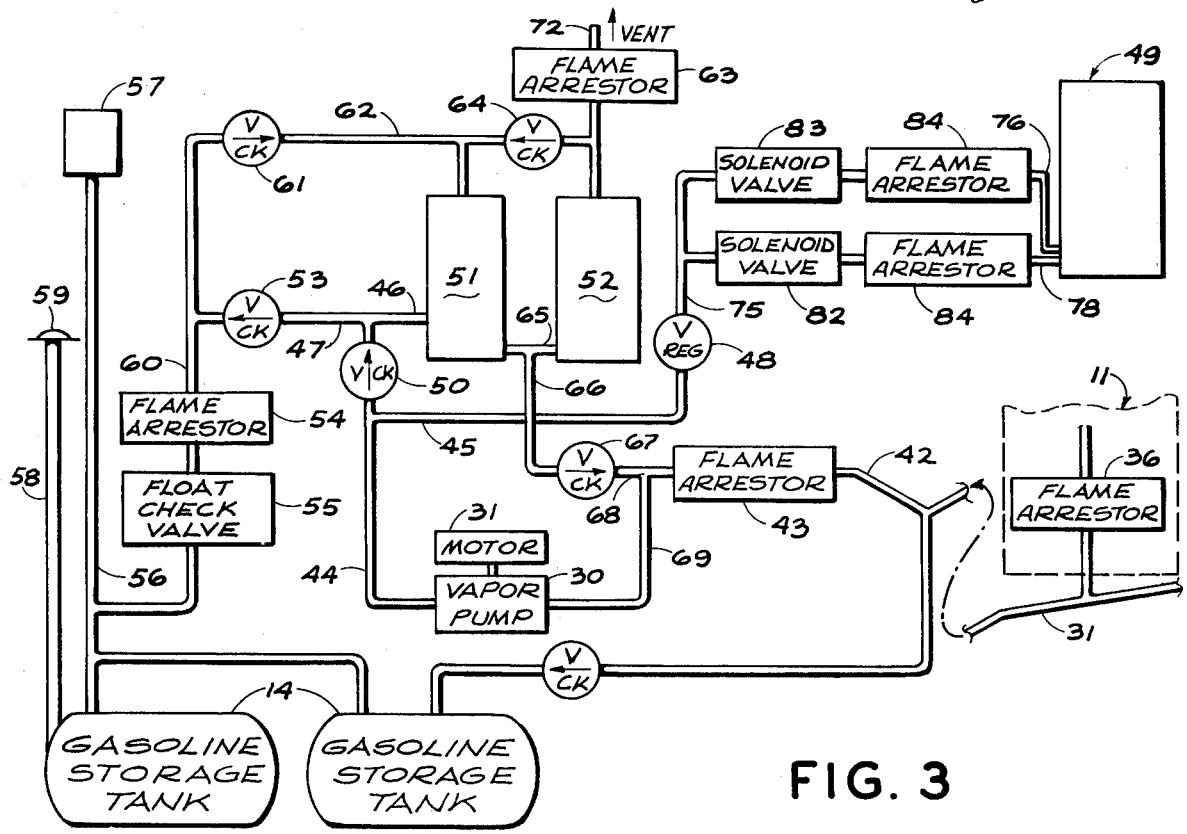
FIG. 3 is a flow diagram illustrating the vapor recovery system of the FIG. 1 apparatus.
Figure 4:
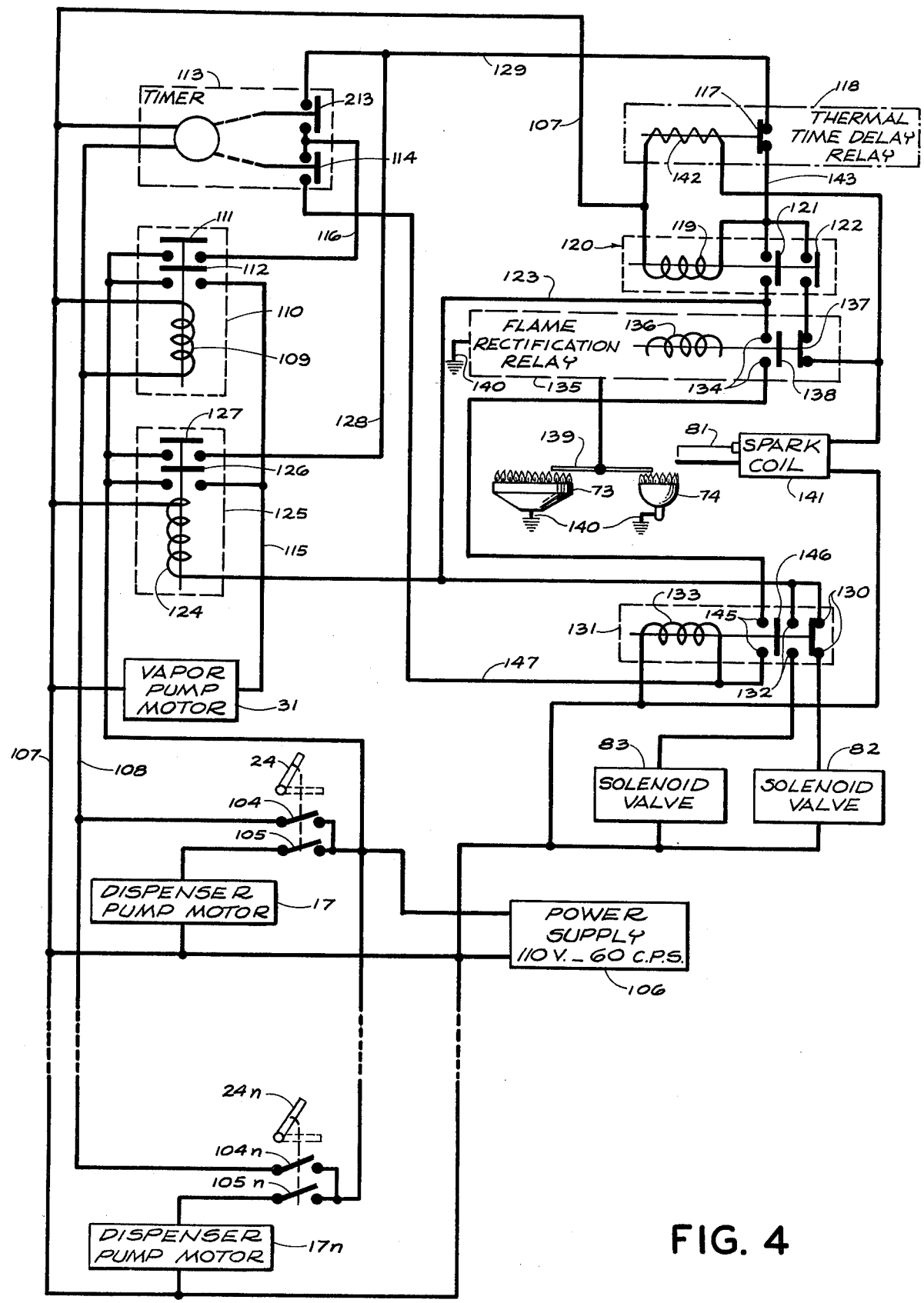
FIG. 4 shows the electrical control circuitry of the FIG. 1 apparatus.

In accordance with the usual practice, each of the dispensing units or pump assemblies 11 has a manually actuated element 24 of some type which serves when manually moved between two different predetermined positions, as from the full line position to the broken line position represented diagrammatically in the circuitry of FIG. 4, to condition that particular dispensing unit for delivery of fuel from its nozzle device 19. Preferably, such actuation of element 24 serves a number of different functions, including a usual first function of commencing fuel delivering operation of pump 16, a usual second function of freeing the associated nozzle unit 19 for removal from a storage recess 28 in a side of the housing 29 of dispensing unit 11, and an additional function of commencing operation of a vapor pump 30 (FIG. 3) and driving motor 31 for commencing withdrawal of vapors from the vicinity of the nozzle. With regard to the second of these functions, the element 24 may take the form of a lever which swings between a position in which it blocks removal of the nozzle from recess 28, to lock the nozzle against removal from housing 29, and a retracted or inactive second position in which lever 24 is out of the path of and permits removal of nozzle 19 from recess 28.

Figure 2:
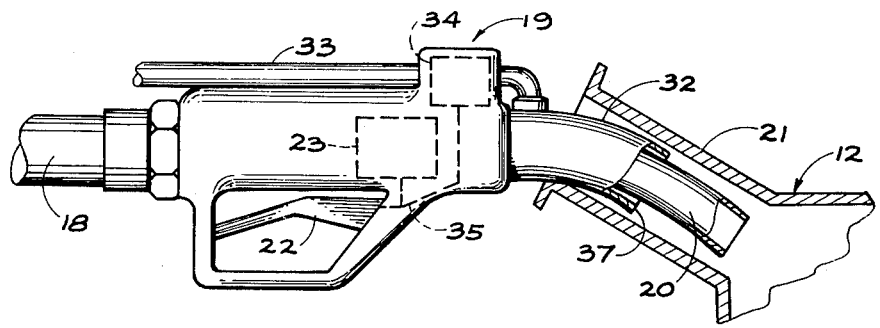
FIG. 2 is an enlarged fragmentary showing of one of the fuel dispensing nozzles of the FIG. 1 apparatus.

For removing the fuel vapors from the vicinity of nozzle unit 19 during a dispensing operation, each such nozzle carries a vapor pick-up element 32 (FIG. 2) which delivers vapors to a flexible suction hose 33 extending along and parallel to the corresponding fuel delivery hose 18. In the preferred arrangement, a valve 34 closes off the flow of vapors from pick-up element 32 to hose 33 except during delivery of liquid through nozzle unit 19. Valve 32 is designed to automatically open when fuel is being fed through the outlet portion 20 of the nozzle into tank 12, and for this purpose may typically be mechanically or otherwise operated by the same trigger element 22 which opens valve 23. FIG. 2 represents diagrammatically at 35 such a mechanical actuating mechanism which simultaneously opens fuel valve 23 and vapor valve 34 in response to operation of trigger 22. Alternatively, the valve 34 may be of a known type which is responsive to the flow of liquid through the nozzle to automatically open vapor valve 34 to an extent proportional to the rate of liquid flow.

When a particular one of the vapor shut-off valves 34 is opened, it places the connected suction hose 33, through a flame arrestor 36, in communication with an underground suction suction line 31 leading to the previously mentioned motor driven vapor pump 30, which acts when in operation to maintain a sub-atmospheric pressure in line 31 and the pick-up element 32 on the nozzle, with the latter then acting to withdraw fuel vapors and some intermixed air from the vicinity of nozzle unit 19, and particularly its discharge portion 20, to thus prevent escape of the vapors outwardly past the nozzle during a filling operation. Pick-up element 32 is disposed about the tubular nozzle structure, and contains an appropriate suction passage which preferably has an annular open end at the location 37 of FIG. 2, positioned to be received within the filling neck 21 of the vehicle tank during a filling operation. Vapors thus enter the inlet opening 37 at the end of pick-up element 32, and flow through a passage within the interior of element 32 to valve 34 and vapor removal hose 33. Pump 30 is capable of maintaining a sufficiently rapid flow of air into element 32 and hose 33 to effectively withdraw all vapors from the vicinity of the nozzle without the necessity for maintaining a seal between the filling neck 21 and the nozzle or pick-up element 32. The vapor pump may therefore actually draw some air into neck 21 for admixture with the fuel vapors, so that both air and fuel enter the suction line 31. This line 31 has a downwardly inclined portion 38 (FIG. 1) which communicates at 39 with a drain line 40 through which any liquid contained within the suction line can drain back by gravity into one or more of the tanks 14 past a swing check valve 41. The remaining vapors, free of any liquid, then flow from the point 39 slightly upwardly at 42 for delivery to vapor pump 30 past a flame arrestor 43.

The vapor from the discharge side of pump 30 flows through a line 44, which leads into three different vapor discharge lines 45, 46 and 47. The first of these lines, number 45, delivers vapor through a pressure regulating valve 48 to a burner system 49 which will be described in greater detail at a later point. Vapor which does not enter this line 45 passes through a check valve 50, from which it may enter either the line 46 flowing to a first of two adsorption chambers 51 and 52, or the line 47 which connects through a check valve 53, flame arrestor 54, and float check valve 55 with a vent line 56 extending upwardly from the underground storage tanks 14. The check valves 50 and 53 pass fluid only in the directions indicated by the arrows in FIG. 3. Float check valve 55 acts to pass vapors in either direction therethrough, that is, either for return of some of the pump vapors to tanks 14 or flow of vapors from the tanks to adsorption chambers 51 and 52, but contains a float which is responsive to a rise in the liquid level to the height of valve 55 to close off this valve and thus prevent the flow of any liquid past valve 55 to the adsorption chambers 51 and 52. The upper end of the vent line 56 from tanks 14 may be connected to a pressure/vacuum vent cap 57, which will discharge vapors from line 56 to the atmosphere in response to the attainment of a predetermined very slightly super-atmospheric pressure within line 56, and which will admit air from the atmosphere into line 56 in response to the development of a predetermined very slight sub-atmospheric vacuum in line 56. Liquid is filled into tanks 14 through conventional vertical fill pipes 58, which extend upwardly to the surface of the earth and have removable caps 59.

The line 60 upwardly beyond float check valve 55, in addition to being connected to the previously mentioned check valve 53, is also connected through an additional opposite flow check valve 61 and connected line 62 to the upper end of adsorption chamber 51. The upper end of the second adsorption chamber 52 is connected through a flame arrestor 63 with the atmosphere, with an additional check valve 64 being connected between the upper ends of the two adsorption chambers and permitting flow leftwardly in FIG. 3. The lower ends of the two adsorption chambers 51 and 52 are interconnected by line 65, connected to a line 66 leading through a check valve 67 to a point of connection 68 to the suction line 69 of vapor pump 30, so that the vapor pump can take suction from the adsorption chambers.

Each of the adsorption chambers includes an outer hollow shell 70, filled with a mass or bed of an adsorbent substance 71, such as activated charcoal, capable of adsorbing the flammable gasoline vapors and thereby separating the vapors from any air intermixed therewith, and then permitting the escape of the cleaned air into the atmosphere at 72. At various times, these adsorbed vapors are withdrawn from the material 71 by downward flow of clean atmospheric air through the beds, and are then burned in the combustion apparatus 49.

As seen in FIGS. 5 to 7, this combustion unit 49 preferably includes two burners 73 and 74 (or two sets of burners if desired), the first of which (73) is a relatively large burner and acts to burn vapors which when delivered through line 75 of FIG. 3 are in a relatively rich vapor-air ratio, and have a relatively high B.T.U. content, desirably between about 180 and 1,000 B.T.U.s per cubic foot of mixture. For this purpose, the line 76 which conducts the rich vapor-air mixture to burner 73 has connected into it an air inductor 77 which communicates with the atmosphere in a relation drawing additional air into line 76 for admixture with the supplied vapor and air to reduce the ratio of fuel to air to a value effectively combustible by burner 73.

The second burner or burner assembly 74 is utilized for burning a supplied mixture of lower B.T.U. content, (desirably between about 50 and 200 B.T.U.s per cu. ft.), and consequently its supply line 78 does not contain an air inductor. Thus, burner 74 burns the supplied mixture without the addition of more air. In the particular arrangement illustrated, the burner assembly 74 includes three individual burner elements 79, which may be cup shaped as shown in FIG. 7, and have short inlet tubes 80 projecting upwardly thereinto from line 78 to introduce the vapor-air mixture into the cups. These elements 79 are positioned closely enough together that ignition of one of the elements will cause ignition of all three. Both the burner 73 and the burner assembly 74 are lighted by a common spark type ignitor 81 positioned between the two burners, and which is close enough to each burner to cause its ignition if flammable vapors in sufficient quantity are supplied thereto. The two supply lines 76 and 78 receive vapors from the previously mentioned line 75 downstream of valve 48, and contain a pair of electrically operated solenoid valve 82 and 83 for closing off the flow of vapors through the two lines, with flame arrestors 84 being interposed downstream of the solenoic valves.

With reference now to FIGS. 5 and 6, the combustion unit 49 includes a vertical stack 85 defining an updraft passage 185 within the lower portion of which the two burners 73 and 74 are located, so that the gases of combustion pass upwardly within passage 185 for discharge from the upper end thereof. More particularly, the stack 85 may be of square horizontal cross section, having four vertical side walls 86, 87, 88, and 89 as seen in FIG. 6. The lower ends of these four walls of the stack may terminate at locations 90 spaced above an imperforate bottom wall 189, so that inlet air can flow through the gaps 91 to the underside of the burners. About stack 85, an outer imperforate housing 92 of larger square horizontal cross section extends vertically upwardly from the bottom wall 189 to an upper edge 94 spaced beneath a horizontal wall 95 to define gaps 96 through which air may enter the upper ends of the passages 97 at the various sides of stack 85. Perforated screens 196 may be provided in these gaps 96. Four additional walls 98 may extend downwardly from top wall 95 at locations spaced outwardly with respect to the four walls of housing 92, to define short upflow passages 99 communicating with the atmosphere at their lower ends through inlet screens 100. Thus, all inlet air from the atmosphere must flow upwardly within passages 99, and then reverse its flow to pass downwardly within passages 97, to then enter the lower end of the stack through the gaps 91 in flowing downwardly, the relatively cool air within passages 97 absorbs heat from the walls of stack 85 in a relation shielding outer housing 92 from that heat and maintaining that housing in cool condition. Further, the circuitous path which air must follow to the burners isolates the burners from direct lateral low level communication with the atmosphere and permits such communication only through the high level air inlets at 100, to prevent accidental ignition of any combustable material in the vicinity of burner unit 49 by the burners. The vertical extent of the stack 85 is such as to assure complete combustion of all vapors before they reach the upper end of the stack. At the upper end of the stack, the products of combustion discharge laterally through two oppositely directed perforated plates or screens 101. A top wall 102 extends across the upper end of the stack in spaced relation to wall 95, and may be connected by spaced vertical walls 201 to two opposite ones of the walls 98, to define at the other two sides of the stack the lateral discharge passages 103 within which screens 101 are located.

To describe now the electrical control circuitry of FIG. 4, each of the dispensing units includes, in association with its nozzle releasing manually actuated lever 24, a pair of electric switches 104 and 105, which are normally open and are closed by swinging movement of the lever 24 to the position in which it permits removal of the nozzle for a dispensing operation. Switch 105 closes a circuit from power supply 106 to the gasoline pump motor 17 of that unit 11, to start the pumping of liquid fuel through hose 18 to the nozzle. Closure of the second switch 104 closes the circuit through two lines 107 and 108 to the coil 109 of a relay 110, to close both of the contacts 111 and 112 of the relay. Simultaneously, closure of switch 104 also energizes the motor of a rotary timer 113, which has a 30 second cycle and acts by cams or otherwise during each cycle to first close upper contact 213 of the timer for a predetermined short interval (preferably two to three seconds), with the lower contact 114 being closed immediately after opening of upper contact 213 and remaining closed for a short interval (desirably two to four seconds). During the remainder of the thirty second cycle of timer 113, both of the switches 213 and 114 are open. The timer repeats this cycle continuously as long as it is energized. The periods of closure of switches 213 and 114 are long enough to enable ignitor 81 to light either of the burners 73 or 74 if sufficient fuel is present to burn.

The closure of lower contact 112 of relay 110 closes a circuit through line 115 to vapor pump motor 31, to commence the operation of vapor pump 30 for creating a sub-atmospheric pressure in line 42 acting to draw vapors by suction from the vicinity of the dispensing nozzle 19 through hose 33, as soon as the delivery of gasoline is commenced by actuation of trigger 22. The closure of upper contact 111 of relay 110 energizes a line 116 leading to the timer. When the first movable contact 213 of the timer closes during a first cycle of the timer, it closes a circuit through the normally closed movable contact 117 of a thermal time delay relay 118, to the coil 119 of a load relay 120, with the second side of coil 119 being connected to the previously mentioned power supply line 107. This closes the two contacts 121 and 122 of relay 120, the first of which contacts in turn closes a circuit through a line 123 to the coil 124 of a relay 125. The lower contact 126 of relay 125 closes a holding circuit to the vapor pump motor 31, while the upper contact 127 of relay 125 closes a holding circuit through a line 128 to the line 129 leading to thermal time delay relay 118, to thereby maintain line 129 energized after contact 213 of the timer opens. Energization of line 123 by relay 120 acts also to deliver power to the upper one of two normally closed contacts 130 of a burner selecting double-pole double-throw relay 131, and to the upper one of two normally open contacts 132 of the same relay. Contacts 130 act when closed to energize solenoid valve 82 for admitting a flammable vapor-air mixture to the low B.T.U. burner assembly 74, while closure of contacts 132 upon energization of the coil 133 of relay 131 opens the circuit to solenoid valve 82 and closes the circuit to solenoid valve 83 to admit vapor and air to burner 73.

In addition to its discussed effect of energizing line 123, closure of movable contact 121 of relay 120 also closes the circuit to the upper one of two normally open contacts of a conventional flame rectification relay 135. The details of such flame rectification relays are well-known in the art, and have not been illustrated in detail in FIG. 4. For simplicity, this relay has been illustrated only diagrammatically by the broken line box 135 of FIG. 4, with the coil of the relay being represented at 136, and acting when energized to open movable contact 137 and close movable contact 138. The flame rectification relay is connected to a flame sensing rod 139 which has portions extending over the flame area of each of the two burner units 73 and 74. An electrical circuit is completed between the flame rectification relay and each of the burners, as by grounding these elements at 140. The flame rectification relay contains a power source which causes current to flow between each of the burners and rod 139 whenever the burner is ignited, as a result of the ionization of the gases between these elements produced by the flame extending upwardly from the burner to rod 139. When this current flows as a result of burning of gases in either of the burners 73 or 74, the resultant current passing from the burner to rod 139 causes energization of coil 136 of the flame rectification relay, to pull contacts 137 and 138 leftwardly. Until such ignition of the one of burners, contact 137 of relay 135 is closed to complete a circuit through relay 118 and contact 122 of relay 120 to the primary side of spark coil 141, and in parallel to the heater coil 142 of thermal relay 118. So long as the primary of spark coil 141 is left energized, igniter 81 produces a continuous spark attempting to ignite the two burners 73 and 74. If the igniter is thus energized for more than a predetermined very short interval sufficient to light the burners if fuel is present (say for example more than five seconds), thermal relay 118 opens to break the main power supply line 143 to relay 120 and thereby deenergize holding relay 125, solenoid valves 82 and 83, spark coil 141 and coil 142 of relay 118.

Besides being connected into the circuit to line 123, the left hand movable contact 121 of relay 120 also acts when closed to energize the upper one of two normally open contacts 134 associated with movable contact 138 of flame rectification relay 135. When this contact 138 is closed, as a result of the sensing of flame in either of the burners by rod 139, contact 138 closes a circuit to the upper one of two normally open contacts 145 of relay 131, whose closure by movable contact 146 of relay 131 closes a holding circuit to coil 133 maintaining relay 131 in its energized state until contacts 134 of the flame rectification relay are opened.

The second movable contact 114 of timer 113 acts through a line 147 to close a primary energizing circuit to coil 133 of relay 131 during the short interval of closure of contact 114 on each cycle of the timer, to thus during that interval deenergize solenoid valve 82 and energize solenoid valve 83 to attempt to light 73 if enough high B.T.U. vapor mixture is present.

To describe briefly a cycle of operation of the apparatus of FIGS. 1 to 4, assume that the carbon cannisters 51 and 52 are initially substantially free of hydrocarbon vapors, and that none of the dispensing units 11 is in operation. In this condition, the vapor pump 30 and the burners are all inactive. When an operator then desires to dispense fuel into a vehicle, he first actuates lever 24 of one of the units 11, to free the associated nozzle 19 for insertion into the filling neck of the vehicle tank, to deliver liquid thereto. The actuation of lever 24 closes a circuit to fuel pump motor 17, to deliver fuel to the nozzle, and also starts operation of timer 113 of FIG. 4 and closes relay 110 to commence operation of vapor pump motor 31. When valve 34 of the nozzle assembly is opened during delivery of fuel to the tank, vapor pump 30 draws vapors from the vicinity of the nozzle through lines 42 and 69, and discharges the vapors through line 44 to the three lines 45, 46 and 47. If enough vapors are present for ignition in the burners, they are burned within unit 49. Enough vapors to replace the amount of liquid withdrawn from storage tanks 14 returns to those tanks through line 47, and excess vapors pass through line 46 into chamber 51, to pass downwardly through the carbon within that chamber, then cross through line 65 to the bottom of chamber 52, and pass upwardly through the carbon in that second chamber. The carbon adsorbs all of the vapors within chambers 51 and 52, and discharges only cleaned air to the atmosphere at 72.

After completion of a dispensing operation, vapor pump 30 remains in operation, and then takes suction through check valve 67 from the adsorption chambers 51 and 52, rather than vapor collection line 42, to desorb the collected vapors from the carbon within chambers 51 and 52, and continue delivery of a vapor-fuel mixture to the burners through line 45 so long as there are enough flammable vapors to support combustion in the burners. During this desorbing process, air flows downwardly through flame arrestor 63, with some of the air flowing down through chamber 52, and the rest of the air flowing in parallel through check valve 64 and then downwardly through chamber 51, and with the two streams then meeting at line 65 to thus draw air through both of the carbon beds. The vapor pump 30 therefore serves two different functions in two different conditions of the apparatus, either to withdraw collected vapors from the vicinity of the nozzles, or to take suction downwardly through the carbon beds during a desorbing process.

As long as dispensing continues, timer 113 turns continuously to attempt to ignite each of the burners 73 and 74 during each 30 second cycle. The short interval of closure of timer contact 213 during each cycle energizes relays 120 and 125 as discussed, to close a circuit through contacts 117, 122 and 137 to the spark coil to attempt to light the burners. During this interval, solenoid valve 82 is open to attempt to light the burner 74. When contact 114 of timer 113 subsequently closes for a short period, this energizes relay 131 to close the circuit to solenoid valve 83 instead of solenoid valve 82, thus stopping the burning of gases within burner 74, and attempting to ignite the burner 73. If a rich enough mixture for combustion in burner 73 is not present, it will not ignite, and upon opening of timer contact 114 relay 131 will return to its normal condition for opening the circuit to solenoid valve 83 and closing the circuit to solenoid valve 82, with resultant relighting by igniter 81 of low B.T.U. content burner 74. If this burner does light, the flame will be sensed by flame rectification relay 135, whose coil 136 will be energized to stop the spark. Ultimately, the mixture will become rich enough for combustion in burner 73, which burner will therefore be ignited during one of the intervals of closure of timer contact 114, to deenergize the ignitor 81 and close a holding circuit through contacts 134 and 145 acting to maintain relay 131 energized. The apparatus will remain in this condition, with the rich mixture burning in burner 73, until the mixture becomes so lean that the flame in burner 73 goes out or falls to a predetermined level at which it does not contact rod 139 and is not sensed by that rod. This releases the contacts of flame rectification relay 135 for rightward movement, to open the holding circuit to relay 131, and allow it to return to its normal condition in which solenoid valve 82 rather than solenoid valve 83 opened, with the igniter 81 then attempting to ignite the reduced B.T.U. content mixture in burner 74. This burning is sensed by flame rod 139, which deenergizes the igniter 81, and the combustion in burner 74 continues until the carbon beds are substantially free of hydrocarbons, at which time the flame in burner 74 goes out or falls to a level at which it cannot be sensed by flame rod 139 to again release the flame rectification relay to energize spark coil 141 and igniter 81 for a further try at ignition and at the same time energize heater 142 of relay 118, which ultimately opens if the igniter cannot produce a flame within 5 seconds, thus deenergizing the entire relay system to its original condition until the next dispensing operation.

FIG. 8 is a fragmentary flow diagram of a variational arrangement which may be considered as identical with that of FIG. 3 except that two seperate vapor pumps 30a and 130a are provided for forming the described dual functions of the single pump 30 of FIG. 3. In FIG. 8, a flame arrestor 43a corresponds to flame arrestor 43 of FIG. 3, and is connected through line 42a (corresponding to line 42) to the fuel dispensing pump assemblies and storage tanks in the same manner illustrated in FIG. 3. The two adsorption chambers 51a and 52a of FIG. 8 correspond to chambers 51 and 52, and are connected to the storage tanks etc. in the same manner as in FIG. 3. The lines 46a and 47a of FIG. 8 correspond to lines 46 and 47 of FIG. 3, with the discharge line 44a from vapor pump 30a connecting to these lines as in FIG. 3, but with the deletion of the check valve 50 of FIG. 3 and the additional discharge line 45 leading to the burners. The second vapor pump 130a takes suction from line 65a interconnecting the lower portions of the two adsorption chambers 51a and 52a, and discharges to the burners through a pressure regulator valve 48a corresponding to valve 48 of FIG. 3.

During a dispensing operation with the equipment of FIG. 8, pump 30a operates to draw vapors from the dispenser nozzles and discharge the vapors partially through line 47a to the storage tanks 14 of FIG. 3, and partially through line 46a to adsorption chambers 51a and 52a, with these vapors passing downwardly through the lower portions of chamber 51a and upwardly through the chamber 52a for adsorption onto the material of the carbon bed, with discharge of the cleaned air upwardly from the upper end of chamber 52a to atmosphere. During the dispensing operation and as long thereafter as a burnable mixture is present in either of the burners 73 or 74 of FIG. 6, the burner pump 130a of FIG. 8 is kept in operation to deliver the vapor-air mixture to the burners.

The circuitry for controlling the variational arrangement of FIG. 8 is the same as that illustrated in FIG. 4 except for the changes represented in FIG. 9. More particularly, it will be noted in FIG. 9 that lower movable contact 126a of relay 125a (corresponding to relay 125 of FIG. 4), instead of being connected to motor 31a of vapor pump 30, is connected into the circuit to motor 131a of burner pump 130a, to keep that burner pump energized as long as relay 125a is actuated. When relay 125a is ultimately deenergized, as a result of opening of the thermal time delay relay 118 of FIG. 4 as discussed above, the burner pump motor 131a is similarly deenergized to become inactive along with the rest of the equipment until the next successive dispensing operation. The timer 113a and relay 110a of FIG. 9 are of course identical to corresponding units 113 and 110 of FIG. 4, and have been included in FIG. 9 to assure an adequate understanding of the circuit changes represented by that figure.

While certain specific embodiments of the present invention have been disclosed as typical, the invention is of course not limited to these particular forms, but rather is applicable broadly to all such variations as fall within the scope of the appended claims.

We claim:
1. Apparatus comprising:
  a liquid dispensing system including tank means for holding a flammable liquid, hose means for dispensing said liquid, and discharge nozzle means on said hose means;
  means for collecting flammable vapors of said liquid, with varying B.T.U. content, from said dispensing system and including collection line means for withdrawing vapors from the vicinity of said nozzle means during a dispensing operation;

two burners connected to said vapor collecting means to receive therefrom and burn collected vapors of varying B.T.U. content, said two burners having different burning characteristics for burning vapors of different high and low B.T.U. contents respectively; and automatic control means operable to burn said collected vapors in a first of said burners but not the second when said vapors are of a first B.T.U. content, and responsive automatically to a change in B.T.U. content of said collected vapors to burn said collected vapors when of a second B.T.U. content in said second burner.

2. Apparatus as recited in claim 1, in which said automatic control means includes means for attempting to ignite said two burners sequentially.

3. Apparatus as recited in claim 1, in which said automatic control means include automatically operable valve means for selectively passing said vapors to said first and second burners, and means for igniting the vapors delivered to said burners.

4. Apparatus as recited in claim 1, in which said automatic control means include valve means for passing said collected vapors to said first and second burners respectively, and timer means operable to actuate said valve means to deliver vapors to said burners in a predetermined sequence.

5. Apparatus as recited in claim 1, in which said automatic control means are operable in response to a decrease in the B.T.U. content of vapors being burned in said first burner to ignite said second burner.

6. Apparatus as recited in claim 1, in which said automatic control means include means responsive to a predetermined reduction in the flame of one of said burners to ignite vapors of reduced B.T.U. content in the other burner.

7. Apparatus as recited in claim 1, in which said automatic control means include valve and igniter means for first passing said collected vapors to a low B.T.U. one of said burners and lighting said one burner, and then intermittently passing vapors to the other burner and attempting to light them therein, said automatic control means including means responsive to a predetermined reduction in the flame of said other burner to actuate said valve and igniter means to pass vapors of reduced B.T.U. content to said one burner and ignite them therein, and responsive to a predetermined reduction in the flame of said one burner to cause said valve and igniter means to cease delivery of vapors to said one burner and cease attempting to ignite said one burner.

8. Apparatus as recited in claim 7, in which said automatic control means include timer means responsive to actuation of said dispensing system to commence a cycle of sequential ignition of said burners.

9. Apparatus as recited in claim 8, in which said automatic control means include means for ceasing energization of said igniter means upon ignition of either burner, and time delay means responsive to energization of said igniter means for a predetermined interval to close off delivery of all vapors to said burners.

10. Apparatus as recited in claim 1, in which one of said burners is constructed to add air to and burn said vapors of high B.T.U. content and the other burner is constructed to burn said vapors of lower B.T.U. content without addition of air thereto by the burner.

11. Apparatus as recited in claim 1, including adsorption chamber means through which said collected vapors are passed and containing a substance adapted to adsorb said vapors, and means for passing air through said adsorption chamber means to remove vapors therefrom and delivering the intermixed air and vapors to said burners for burning therein in accordance with the B.T.U. content of the mixture.

12. Apparatus comprising:
a liquid dispensing system including tank means for holding a flammable liquid, hose means for dispensing said liquid, and discharge nozzle means on said hose means;
adsorption chamber means through which vapors collected from the vicinity of said nozzle means during a dispensing operation are passed and containing a substance adapted to adsorb said vapors;
burner means for burning vapors desorbed from said substance;
a vapor pump;
a first suction line leading to said vapor pump and connected to said adsorption chamber means at a location to draw air from the atmosphere through said adsorption chamber means to desorb vapors therefrom, and to then conduct the vapor laden air through said first suction line to said pump;
a second suction line leading to said pump from a location near said nozzle means and acting to withdraw flammable vapors from the vicinity of said nozzle means to the pump without passage through said chamber means before reaching the vapor pump;
a first discharge line leading from said vapor pump to said burner means to discharge vapors thereto without flow through said adsorption chamber means; and
a second discharge line leading from said pump to said chamber means to discharge vapors thereto.

13. Apparatus as recited in claim 12, including first and second check valves in said first suction line and said second discharge line respectively of the pump for preventing vapor flow from the pump through said first suction line or to the pump through said second discharge line.

14. Apparatus as recited in claim 13, including a third discharge line which discharges vapors from said pump to said tank means for holding said flammable liquid and which contains a check valve preventing reverse flow from said tank means.

15. Apparatus as recited in claim 14, in which said burner means include first and second burners having different burning characteristics for burning vapors of high and low B.T.U. content respectively, there being manually actuated means for conditioning said dispensing system for the dispensing of said flammable liquid through said nozzle means, and automatic control means responsive to actuation of said manually actuated means to commence operation of said vapor pump and said burner means, said automatic control means being operable to burn said vapors in said different burners at different times in accordance with the B.T.U. content of the vapors discharged from the vapor pump.

* * * * *